March 28, 1933.  D. TENNEY  1,903,250

AIR CONDITIONING APPARATUS

Filed Nov. 11, 1930  2 Sheets-Sheet 1

INVENTOR
Dwight Tenney
BY
Ramsey and Kent
ATTORNEYS

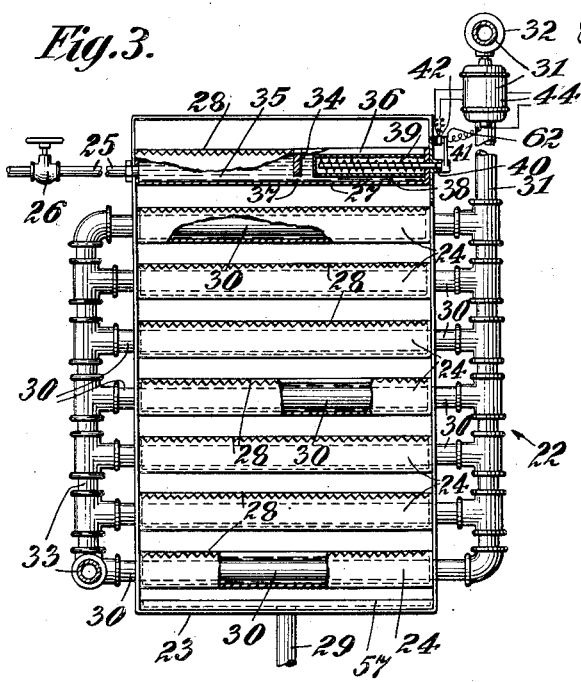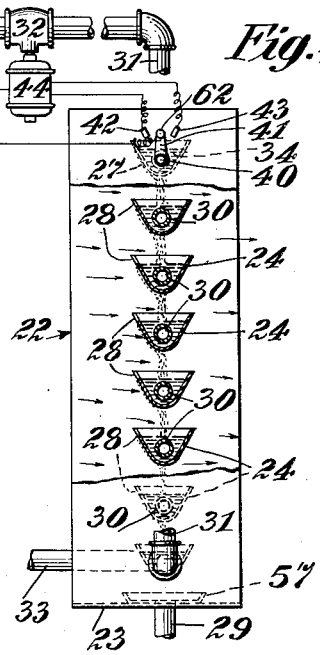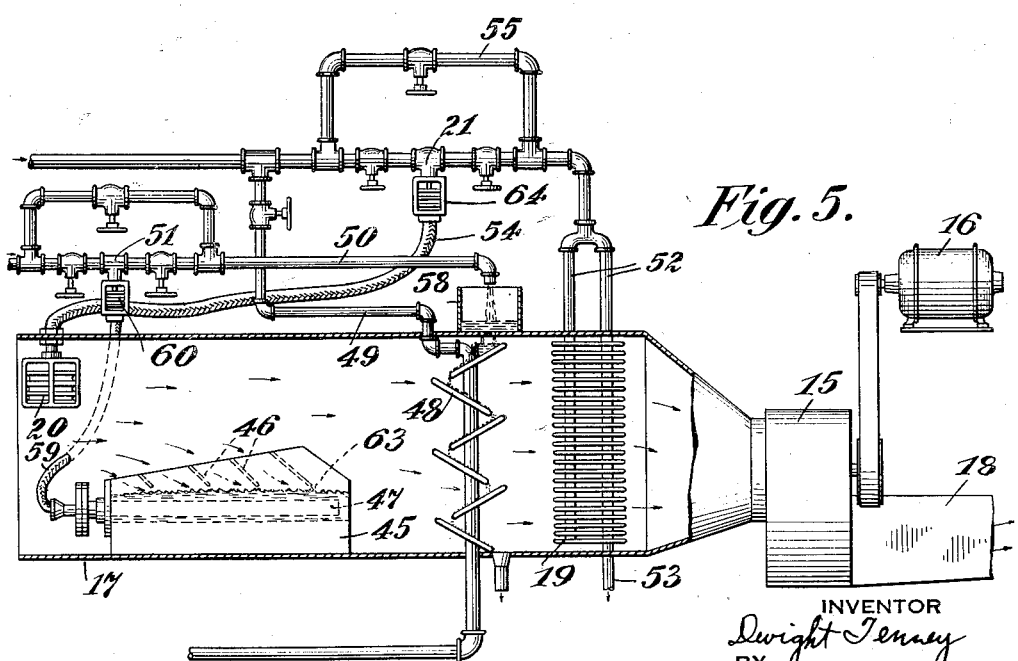

Patented Mar. 28, 1933

1,903,250

UNITED STATES PATENT OFFICE

DWIGHT TENNEY, OF MONTCLAIR, NEW JERSEY

AIR CONDITIONING APPARATUS

Application filed November 11, 1930. Serial No. 494,841.

This invention relates to methods and apparatus for conditioning the air of a room or other closed compartment, particularly to maintaining predetermined conditions of temperature and humidity.

A particular object of the invention is to provide an improved method and apparatus for increasing and maintaining the effective humidity in a room or compartment. The term "effective humidity" is used herein to take cognizance of the fact that not only the so-called "relative humidity" but also the movement of air over the products treated is equally important in the effect which the moisture laden air will produce. For instance, air at 80° F. and 80% relative humidity passing over dough at a velocity of 600 feet per minute will produce a thick leathery crust on the surface of the dough, whereas the same air passing over the same dough at a velocity of one foot per minute will leave the dough with a soft and velvety surface.

In carrying out this object it has been necessary to develop a method of heating the room by a combination of naturally induced heated or cooled air currents and controlled heated air forcibly recirculated; also to develop a novel apparatus for producing the necessary water vapors and a simple, novel and suitable method for controlling the amount of vapor produced, all of which will be described in detail.

An outstanding feature of this invention is the fact that whereas all of the humidity is introduced into the recirculated air stream, only a small part or none of the heating and cooling effects are introduced into the air in the apparatus itself.

A further feature resides in the design of the humidifying element which is so designed that the temperature of the air passing through it will not be raised or lowered while in the act of picking up the vapors.

Another feature relates to the control of the amount of humidity by means of an independent pool of water. As will be shown, if air at a constant temperature is passed over a pool of water at a constant velocity of sufficient force to vigorously agitate the surface of the water, the temperature of the pool will fluctuate depending upon the amount of moisture in the air. For instance drier air passing over the pool will cause a much greater depression of temperature than moist air and vice versa.

The above features combine to form a humidifying system that has the following advantages over the present conventional systems:

1.—The apparatus required is much less expensive than those at present used.
2.—The humidity effect is not localized as in unit humidifiers.
3.—The heat transferred into or from the room is not dependent on the humidity produced, with the result that uninsulated rooms can be effectively humidified irrespective of outside conditions.
4.—The phenomenon of sweating is eliminated.
5.—The system produces a much higher "effective humidity" with lower relative humidity than the present conventional systems.

While preferred methods and types of apparatus are disclosed herein for purposes of illustration, it should be understood that various changes may be made without departing from the spirit and scope of the invention as hereinafter set forth and claimed.

In the drawings:

Fig. 3 is a front elevation, partly in section, of the vaporizing section and its control;

Fig. 4 is a side elevation partly in section of the vaporizing section;

Fig. 5 is a view corresponding to Fig. 2 but illustrating certain modifications in the humidifying section and control.

Figure 1:
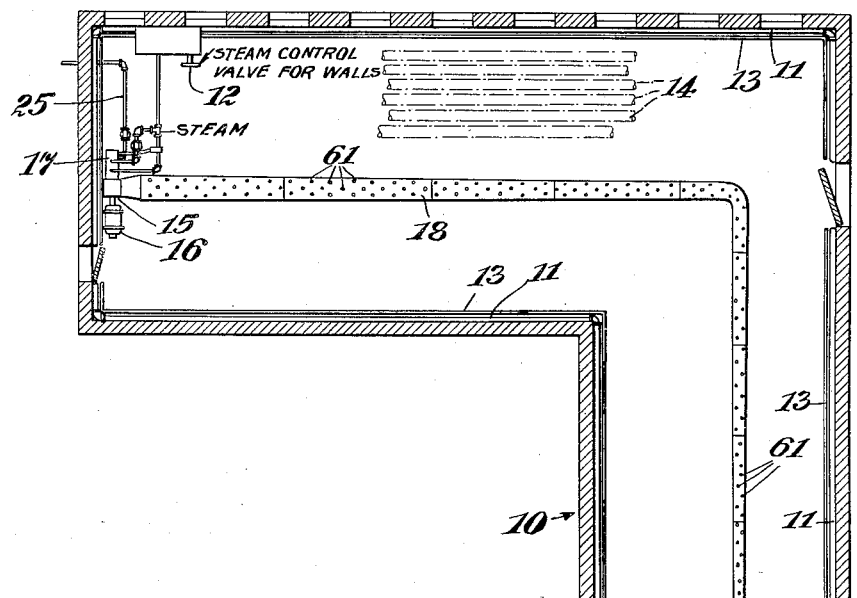
Fig. 1 is a plan of a chamber equipped with the humidifying equipment, ducts, heating and cooling coils according to the present invention.

Referring to these drawings, 10 represents a chamber which it is desired to humidify. Along the walls of this chamber, properly proportioned to equalize incoming cold, are steam pipes 11 controlled manually or automatically by valve 12. Extending to within 6 or 8 inches of the floor and adjacent to the coils 11 are insulating shields 13. Under the ceiling of the room are hung cooling coils 14, shown only partially, without the control valve. A recirculating fan or blower 15 is driven at a constant speed by a motor 16. The humidifier and heat balancer are shown in detail in Fig. 2. A tapered elliptical or otherwise suitably shaped duct 18 with properly designed and spaced holes 61 punched in its top is hung from the ceiling. If the room has a different shape it may be found necessary in order to obtain uniform distribution of the recirculated air to branch this duct.

Figure 2:
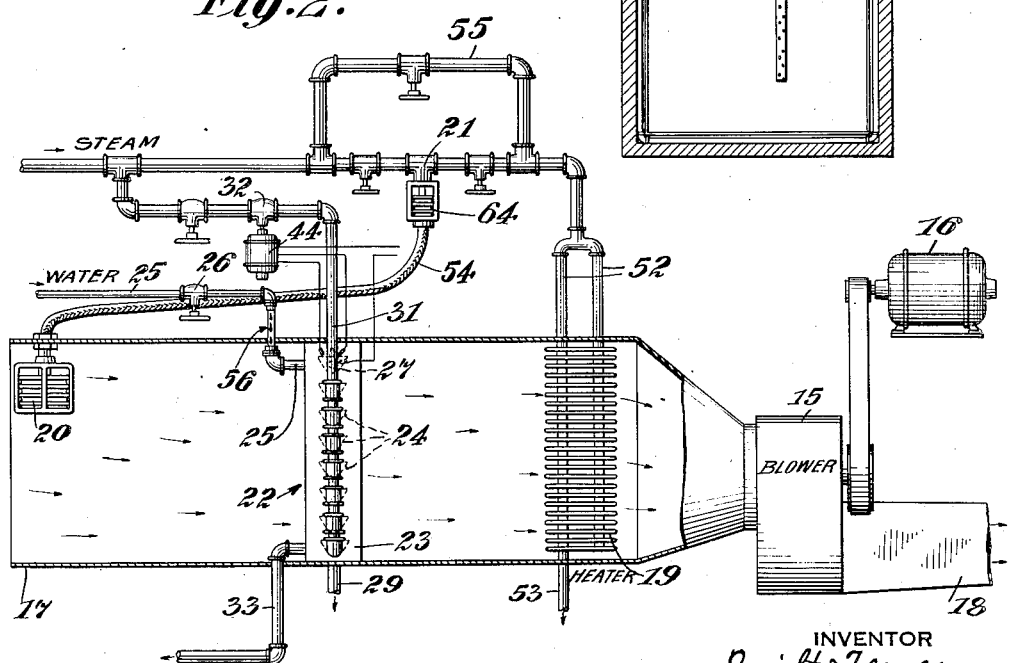
Fig. 2 is a detail, partly in section, of the humidifying element, balancing heater and controls.

Fig. 2 shows the general arrangement of the vaporizing section, heater and controls. In a housing 17 open at one end and tapered at the other to fit the blower 15, is mounted any suitable type of blast heater 19. This heater 19 is connected through suitable pipes 52, valves 21 and fittings to the original source of steam supply and by a drain 53 to a proper steam trap or outlet. Valve 21 as shown is operated on the well known sylphon principle, the controlling element 20 being mounted in the air current, which is indicated by arrows, and connected to valve 21 by the proper connector 54. A by-pass 55 is incorporated to permit of the operation of the equipment by manual control when it becomes necessary to overhaul valve 21. The proper adjustment of valve 21 is obtained by a threaded nut 64. While valve 21 as shown is operated on the sylphon principle, this valve may be replaced by any suitably controlled valve operated either electrically or magnetically.

The vaporizing section 22 is shown in detail in Fig. 3. This section is connected to a source of water supply by pipe 25, and a manually controlled valve 26. From the bottom of this section, pipe 29 leads to a drain. The section is also connected to the steam supply by pipes 31 and valve 32 described later. Pipe 33 leads the steam condensate to a suitable trap (not shown).

Figs. 3 and 4 show in detail the humidifying or vaporizing section and control. In a suitable casing 23, the edge of which might be formed with vertical flanges for easy connection with associated parts, are mounted horizontal watertight or semi-porous troughs 24, the upper edges 28 of which are serrated so as to permit a uniform distribution of water over the sides. Water is introduced into the upper trough through pipe 25, sight drip feed 56 and control valve 26 and drips from trough to trough. Under the bottom trough is a pan 57 which, through pipe 29, leads the excess water to a suitable drain. These troughs 24 are so designed as to permit the smallest possible amount of water to lie in them. Copper, brass or other suitable steam pipes 30 run through these troughs and are submerged at all times. These pipes 30 are headed into a steam main 31 and connected to the steam generator source through an automatically controllable valve 32. The condensation flows off through pipe 33 to a steam trap. Although the water heating elements are here shown as cylindrical steam pipes, this is not to be considered restrictive, as it may be found desirable to change their shape or install controlled electric heaters in their stead. In some cases it might be desirable to serrate both edges of the troughs 24.

The upper trough 27 which contains the control element is constructed differently from the others. This trough does not have a heating element and the serrations extend only part way along the upper lip. At the end of the saw teeth is a lateral dam 34 which divides the trough into two sections 35 and 36. These sections are connected with each other by a small port 37. This permits the water level in both to be the same but as the sides of section 36 extend higher than the sides of section 35 the water will not overflow from this section 36. In section 36 extends the protective shield 38 of the spiral bimetallic control element 39. This element being fixed at one end, applies torsion to shaft 40 which extends through the casing and has mounted on the outer end an electrically insulated arm 41 bearing a contactor 57. This contactor swings between points 42 and 43, which are adjustable so that they may be set at the desirable limits. These in turn are connected with the electric motor valve 44 and so wired that on making one contact the valve opens and on making the other the valve will close. The details of such wiring are well understood in the arts.

Fig. 5 shows an alternate humidifying section involving a like method of control. In this alternative an insulated container 45 holds the water bath into which the thermal sylphonic actuating element 47 is submerged. Louvers 46 deflect the air upon the water bath causing a rippling action that is essential to the proper humidity control. In this case the amount of humidity is controlled by regulating the amount of water flowing over evaporating steam plates 48 kept continually hot by steam admitted through pipe 49. The water is admitted over the plates by distributing trough 58 fed through pipe 50 and controlled by a throttling valve 51. This valve is suitably connected to the thermal element 47 by tube 59 and the valve itself adjusted by screw 60. This type of section is applicable for humidifying compartments where a high, or relatively high, temperature is maintained.

Another method of supplying vapor to the air can be used where the chamber is to be kept at a relatively high temperature. By this method steam would be admitted directly into the duct 17 in sufficient amount to supply the required vapor, and the supply of steam would be controlled by a "control pool" or other humidity-responsive device.

Operation

In order to clearly explain the operation of this method of humidification and control, and to point out the various improvements over the conventional dew point control systems, a specific application will be described.

The specific case used in this description (not limitative) will be a dough room in a bakery, the wall construction of which provides only partial insulation. In such a room it is required to maintain a temperature of 78°–80° F. as the optimum for yeast propagation and an "effective humidity" which will prevent the formation of a tough leathery crust on the surface of this dough or sponge.

Under the conventional dew point control systems the air of this room, either fresh or recirculated, passes through a conditioning apparatus which by some method sprays or otherwise saturates the air and emits it saturated at a given temperature. The air then passes through some type of eliminators which remove the entrained moisture and is then heated up so that when it commingles with the air in the room, the desired temperature and relative humidity is produced. But as the "effective humidity" and relative humidity are not the same, as previously pointed out, the formation of crust cannot always be prevented by this method. For example, to obtain 80° F. and 75% relative humidity it is necessary by the dew point method to saturate the air at 72° F. Now if heat enters the room, as it will in uninsulated rooms on hot days, in such amounts that, despite the introduction of 72° F. saturated air, the temperature will rise above 80°, only two courses are open, either to reduce the temperature of entering air by saturating it at a temperature lower than 72° F., or by introducing a larger volume of 72° F. air. Both of these procedures will reduce the "effective humidity" (the former by lowering the relative humidity, and the latter by increasing the drafts) and the dough will crust if 80° F. is maintained.

Also in the winter, if all the heat for heating the room is introduced in the air stream as is at present the case in the dew point controlled systems, then either a large volume of air must be introduced, destroying the "effective humidity" because of drafts, or else the temperature of the air must be raised so high that undesirable temperature differentials will occur in different parts of the chamber. The phenomena of sweating on the windows will occur because these windows will be below the dew point and the only heat to raise them above this point must be supplied by moist hot air that has received its heating potential in the humidifier.

The method covered by the present invention involves two distinct and independent factors; one, the maintenance and control of the proper temperature condition and secondly the maintenance and control of the proper "effective humidity" as deferentiated from relative humidity.

Temperature maintenance and control (winter)

During the winter it will be necessary to heat the room. Steam valve 12 is opened and steam admitted to the wall heating coils 11. About 80% of the heat necessary to maintain the desired temperature is admitted by this source. The insulated shields 13, being in front of these pipes, prevent the direct radiation of heat from them out into the room but the coils will heat the air between the shields and the wall and induce an upward current of heated air that will rise along the wall and diffuse along ceiling. This air stream will be hotter than the bulk of air of the room itself and will counteract the cold as it enters through the walls and ceiling. This curtain of warm air prevents the moist air of the room reaching the windows and precipitating its moisture.

In order to maintain a uniform temperature a small blast type heater 19 is installed in the recirculating air system. This heater supplies the balance of heat units necessary to bring the room up to the desired temperature. The amount of steam entering heater 19 is thermostatically controlled by valve 21 which in turn is actuated by the thermal element 20 here shown located in the humidifying duct but which might be located elsewhere in the room if desired. The advantages of this dual heat supply are:

1.—Only a small volume of air need be circulated, reducing the size of blower, ducts, etc. etc. The small volume of air also helps raise the "effective humidity" as will be described later.

2.—Control instruments are smaller because of the smaller amount of heat units controlled.

3.—Temperature can be more closely controlled.

4.—Localized hot spots in the room are prevented.

5.—Sweating is eliminated.

6.—Amount of recirculated air is independent of the heat insulation of the room.

7.—No large differentials of temperature are noted as most of the heat is applied where

Temperature maintenance and control (summer)

During the summer it is necessary to artificially cool this chamber. This is done by means of coils 14 circulating ammonia, brine, or other suitable cooling medium. Under these coils is hung a drip pan, not shown, to catch the condensate. The control of this system can be automatic or manual, equipment for such control being well known and understood in the trade. It should be noted that the cooling is wholly independent of the humidifying medium and because of this a relative humidity can be created and maintained wholly independent of the cooling effect. This is not the case in a dew point control system, where the cooling effect is distributed throughout the room by the recirculating humidifying air stream.

The advantage of such a method is apparent as creation of humidity is in no way effected by the amount of cooling required.

Humidity creation and control

In order to maintain a desired "effective humidity" the air in room 10 is recirculated through a humidifying section 22. It is very important in order to obtain the highest "effective humidity" that the air currents in the room be reduced to a minimum. It has been found that the air in the room should not be recirculated more than 3 to 5 times per hour. The matter of draughts refers not only to sensible air movements but to air movements so slight that they are physically imperceptible.

The recirculated air is drawn through the humidifying duct by means of a blower 15 and distributed throughout the room by means of a tapered elliptical duct 18 perforated on the top as at 61 and so designed as to give a uniform distribution of the air. The air is drawn through the humidifying section 17 and over the troughs 24 which are at all times kept full of water and slightly overflowing so that the outer surfaces of the troughs 24 are kept wet. The flow of the water into these troughs can be regulated by hand valve 26 and observed through sight drip 56.

Valve 26 is set so that a minimum of only a few drops at a time passes out through drain 29. Once set this flow of water is not changed.

It should be noted that the serrated edges 28 provide a means for uniformly wetting the outer surfaces of the troughs. The air is drawn through these troughs at a fixed lineal velocity (in one installation at about 2000 feet per minute) and the amount of moisture absorbed by it will depend solely on the temperature of the water over which it passes. The temperature of the water is raised by means of steam pipes 30 passing through the troughs. When the steam is cut off from the pipes the water will chill rapidly due to the loss of latent heat of vaporization and the evaporation will be correspondingly checked. Here attention should be called to a pertinent point in the design. If the liquid and wetted surfaces are large in proportion to the amount of vapor evaporated the moisture will go into the air extracting the necessary latent heat from the air and thus reduce its temperature below that at which it enters the humidifying duct. If on the other hand the amount of wetted surface is small in comparison with the evaporation required, a large amount of heat will have to be forced into the liquid by the steam pipe which will not only supply the necessary latent heat but will also raise the temperature of the water and transfer sensible heat to the air, raising its temperature. It will therefore be seen that there is a medium between these extremes and it is possible to use a ratio of wetted surface to the amount of water vaporized so that the air will pass through the humidifying section with practically no change of temperature. This is highly desirable, as the thermal control is then totally disassociated from the humidifying operation.

As pointed out above the amount of vaporization can be controlled by varying the amount of steam entering pipes 30. The problem now resolves itself into controlling the amount of steam by the humidity in the air. To accomplish this a "control pool" 36 or 45 is used. It is a well known fact that if air at a constant (or approximately constant temperature) and constant velocity is passed over a body of water, the amount of evaporation induced will depend solely upon the humidity in the air. The drier the air the more rapid will be the evaporation and the cooler the pool of water will become. The reverse is also the case as the more moist the air the less cool will the water become. So for any definite pool of water, assuming constant air temperature and velocity, there will be a definite temperature set up for every humidity. It is this principle that is used in this invention for the control of the humidity. It is applied as shown in Figs. 3 and 4 with an alternate use shown in Fig. 5.

A constant water level is maintained in compartment 36 by means of port 37. The dam 34 is interposed so that the temperature of the water in the "control pool" 36 is not appreciably affected by the water entering at 25. The air stream passes over this pool at the rate of 2000 feet per minute or faster. This velocity will cause the water to ripple greatly, increasing its exposed surface. If the air stream is deficient in moisture the temperature of the bath will be depressed. This will affect the bimetallic thermal element 39 rotating shaft 40 so that contactor 62 moves to the left affecting a contact with 42 completing an electric circuit that will open motor valve 44 admitting steam to the header 31 and increasing the vaporization as shown above. As the moisture in the air stream increases bath 36 rises in temperature causing contactor 62 to move to the right, making contact with 43 and closing the valve. It has been found in practice that this constitutes a very accurate and reliable control.

A modification of this control is shown in Fig. 5. Here the control pool 45 is not built directly into the vaporizing element, but is placed ahead of it. The air is deflected down upon the water surface 60 by means of louvers 46 setting up the desirable rippling action. In this bath is submerged the thermostatic element of a sylphonic controlled regulating valve 51 which in this variation controls the flow of water over the evaporation plates 48, the heat of the plates being held constant. Thus the more water passed over the plates 48 the more vapor will be produced. As the humidity in the air stream increases the temperature of the bath 63 rises, choking off the flow of water which in turn checks the humidity produced, or vice versa.

While the "control pool" is the preferred device for controlling the rate of vaporization from the vaporizer, it should be understood in operating the humidifying system any preferred humidity-responsive device may be used to control the rate of vaporization in accordance with the humidity conditions in the air of the chamber.

*Distributing system*

The distributing duct 18 is formed of standardized tapered sections 52, connected to each other in such a manner that the duct decreases in cross-section from the blower 15 to the other end of the duct.

The duct is made in elliptical section in order to keep it from occupying too much head room as it hangs down into the room from its normal position near the ceiling. This elliptical shape also causes smooth flow of air through the duct and promotes delivery through the perforations in the upperside of the duct.

I claim:

1. Apparatus for maintaining the air of a chamber at a predetermined temperature which comprises heat-delivery means located along the walls of the chamber, said heat-delivery means being of sufficient capacity to supply a major portion of the required heat, insulating shields disposed on the chamber side of the heat-delivery means, an air conditioning duct through which air from the chamber is circulated, auxiliary heating means for supplying the remainder of the required heat to the air passing through the conditioning duct, and a thermostat disposed to automatically control the auxiliary heating means according to the temperature of the main body of air of the chamber.

2. Apparatus for maintaining the air of a chamber at a predetermined temperature which comprises heat-delivery means located along the walls of the chamber, said heat-delivery means being of sufficient capacity to supply a major portion of the required heat, an air conditioning duct through which the air of the chamber is circulated, auxiliary heating means under automatic control for supplying the remainder of the required heat to the air passing through the conditioning duct, and cooling coils located on the ceiling of the room to remove excess heat when necessary.

3. Apparatus for maintaining the air of a chamber at a predetermined temperature which comprises heat-delivery means located along the walls of the chamber, said heat delivery means being of sufficient capacity to supply a major portion of the required heat, insulating shields disposed on the chamber side of the heat-delivery means, an air conditioning duct through which the air of the chamber is circulated, auxiliary heating means under automatic control for supplying the remainder of the required heat to the air passing through the conditioning duct, and cooling coils located on the ceiling of the room to remove excess heat when necessary.

4. In combination, a chamber, the air of which is to be maintained at a predetermined temperature and relative humidity, heat-delivery means located in the chamber, said heat-delivery means being of sufficient capacity to supply a major portion of the required heat, an air conditioning duct in communication with the chamber and having an inlet end and a discharge end, an auxiliary heating means in said duct for supplying the remainder of the required heat to the air passing through the conditioning duct, a thermostat disposed to automatically control the auxiliary heating means according to the temperature of the main body of air of the chamber, a vaporizing unit in the duct and located between the inlet end of the duct and the auxiliary heating means and adapted to supply humidity to the air stream by evaporation of a liquid, and a humidity-responsive device disposed to automatically control the vaporizing unit according to the relative humidity of the main body of air of the chamber.

5. In combination, a chamber, the air of which is to be maintained at a predetermined temperature and relative humidity, refrigerating coils located in the chamber, an air conditioning duct in communication with the chamber, a vaporizing unit in the duct and adapted to supply humidity to the air stream by evaporation of a liquid, and a humidity-responsive device disposed to automatically control the vaporizing unit according to the relative humidity of the main body of air of the chamber.

6. A device for humidifying air which comprises a conditioning duct through which part of the air from a chamber is circulated, a humidifier for supplying humidity to the air passing through the duct, a control pool in the duct between the humidifier and the inlet end of the duct, a thermostat associated with the control pool and controlling the action of the humidifier responsive to temperature changes of the control pool, a deflector to direct downwardly onto the surface of the pool the current of air passing through the duct, and a single fan for drawing the air through the duct and over the surface of the control pool.

DWIGHT TENNEY.